United States Patent [19]
Cifuentes et al.

[11] Patent Number: 5,961,770
[45] Date of Patent: Oct. 5, 1999

[54] SILICONE PRESSURE SENSITIVE ADHESIVES

[75] Inventors: Martin Eric Cifuentes; William Neal Fenton, both of Midland, Mich.

[73] Assignee: Dow Corning Corporation, Midland, Mich.

[21] Appl. No.: 09/192,690

[22] Filed: Nov. 16, 1998

Related U.S. Application Data

[62] Division of application No. 08/675,974, Jul. 5, 1996, Pat. No. 5,869,556.

[51] Int. Cl.[6] .................................................... C09J 183/06
[52] U.S. Cl. .............................. 156/329; 156/60; 525/477
[58] Field of Search ....................... 156/60, 329; 525/477

[56] References Cited

U.S. PATENT DOCUMENTS

| | | | |
|---|---|---|---|
| 2,736,721 | 2/1956 | Dexter | 260/42 |
| 2,814,601 | 11/1957 | Currie et al. | 260/29.1 |
| 2,857,356 | 10/1958 | Goodwin | 260/42 |
| 3,528,940 | 9/1970 | Modic | 260/37 |
| 3,929,704 | 12/1975 | Horning | 260/29.1 |
| 4,831,070 | 5/1989 | McInally et al. | 524/267 |
| 4,865,920 | 9/1989 | Sweet | 428/447 |
| 5,100,976 | 3/1992 | Hamada et al. | 525/477 |
| 5,248,739 | 9/1993 | Schmidt et al. | 525/477 |

FOREIGN PATENT DOCUMENTS

| | | | |
|---|---|---|---|
| 0459292 | 10/1992 | European Pat. Off. | C09J 183/04 |
| 998232 | 8/1962 | United Kingdom . | |

*Primary Examiner*—Patricia A. Short
*Attorney, Agent, or Firm*—Timothy J. Troy

[57] ABSTRACT

The present invention relates to pressure sensitive adhesive compositions which are prepared by heating a mixture of a polydiorganosiloxane, a silicone resin copolymer, and an organic amine compound or metal salt thereof, and then adding an organic peroxide or azo compound to the resultant reaction product. The silicone pressure sensitive adhesives of this invention are useful in preparing articles such as pressure sensitive tapes, labels, emblems and other decorative or informational signs.

20 Claims, No Drawings

SILICONE PRESSURE SENSITIVE ADHESIVES

This is a division of application Ser. No. 08/675,974, filed Jul. 5, 1996, now U.S. Pat. No. 5,869,556.

BACKGROUND OF THE INVENTION

The present invention relates to silicone pressure sensitive adhesive compositions. More particularly the present invention relates to pressure sensitive adhesive compositions which are prepared by heating a mixture of a polydiorganosiloxane, a silicone resin copolymer, and an organic amine compound or metal salt thereof, and then adding an organic peroxide or azo compound to the resultant reaction product.

Silicone pressure sensitive adhesives (PSA's) are typically produced by either blending or condensing together a silicone resin and a silicone polymer. For example, Dexter et al. in U.S. Pat. No. 2,736,721 discloses a silicone pressure sensitive adhesive that is produced by mixing or condensing a silicone resin and a diorganopolysiloxane polymer having a viscosity of at least 1,000,000 centistokes.

Currie et al. in U.S. Pat. No. 2,814,601 discloses a silicone pressure sensitive adhesive that is produced by mixing together a silicone resin and a hydroxyl end-blocked diorganopolysiloxane fluid having a viscosity of from 5,000 to 1,000,000 centistokes. Currie et al. also discloses a permanent adhesive that is produced by adding a cross-linking agent and curing catalyst to the pressure sensitive adhesive composition.

Goodwin et al. in U.S. Pat. No. 2,857,356 discloses a silicone pressure sensitive adhesive that is produced by condensing together a silicone resin that is a cohydrolysis product of a trialkyl hydrolyzable silane and alkyl silicate with a linear organopolysiloxane fluid having a viscosity of greater than 200,000 centipoise.

Great Britain Patent Specification No. 998,232 discloses a process for preparing a pressure sensitive adhesive which comprises heating a mixture of a benzene soluble resin copolymer containing $SiO_2$ units and $R_3SiO_{1/2}$ units where R is a monovalent hydrocarbon radical, a hydroxyl terminated diorganopolysiloxane liquid having a viscosity in the range of 100 to 100,000 cs. at 25° C., and (3) at least one of the group consisting of primary amines, secondary amines, tertiary amines, carboxylic acid salts of the said amines, and quaternary ammonium salts at a temperature above 100° C. until the desired adhesive character is obtained.

Modic in U.S. Pat. No. 3,528,940 discloses compositions comprising the siloxane product of intercondensation at a temperature of from about 80° C. to 150° C. of a mixture of ingredients comprising 100 parts of a silanol chain-stopped polydiorganosiloxane gum having a viscosity of at least about 10,000,000 centistokes at 25° C., a benzene-soluble resinous copolymer containing $R_3SiO_{0.5}$ units and $SiO_2$ units where R is a monovalent hydrocarbon radical, and a finely divided silica having a surface area in excess of about 100 square meters per gram.

Horning in U.S. Pat. No. 3,929,704 discloses a pressure sensitive adhesive composition comprising a silicone resin, a silicone gum, and a curing agent therefor, the curing agent comprising 2,4-dichlorobenzoyl peroxide in admixture with a plasticizer and an extender therefor, the extender comprising an alkylarylsiloxane or an alkylaralkylsiloxane fluid.

McInally et al. in U.S. Pat. No. 4,831,070 discloses a composition for forming elastomeric pressure sensitive adhesives comprising a mixture of a resin copolymer containing triorganosiloxy units and $SiO_{4/2}$ units, a polydiorganosiloxane fluid endcapped with silicon-bonded hydroxy groups and having a viscosity of from about 50 to 300,000 centipoise at 25° C., an organosilicon compound containing an average of more than two silicon-bonded alkoxy groups per molecule, and a condensation catalyst such as metal salts of carboxylic acids.

Sweet in U.S. Pat. No. 4,865,920 discloses a hot-melt silicone pressure sensitive adhesive composition comprising a silicone resin, silicone fluid, and an ester having the formula RC(O)OR' where R is a monovalent hydrocarbon radical having from 2 to 32 carbon atoms, and R' is a monovalent hydrocarbon radical having from 1 to 14 carbon atoms.

European Patent Application No. 0459292 discloses a composition suitable for use as a pressure sensitive adhesive, comprising a homogenous mixture of 50 to 95 parts by weight of a first pressure sensitive adhesive composition comprising (I) a solid, benzene soluble resin copolymer containing $R_3SiO_{1/2}$ units and $SiO_{4/2}$ units where R is a monovalent hydrocarbon radical and (II) a hydroxyl end-blocked diorganopolysiloxane having a viscosity of about 100,000 to 500,000,000 centipoise at 25° C., and 5 to 50 parts by weight of a second pressure sensitive adhesive composition comprising a resin copolymer as described for (I) above, and a hydroxyl end-blocked diorganopolysiloxane as described for (II) above. The EP'292 reference further discloses that the above composition can be prepared by heating the mixture at a temperature of 130° C. in an organic solvent and in the presence of a base catalyst such as alkali metal hydroxides or aminofunctional silanes. The EP'292 reference further discloses that acids for neutralizing the condensed mixture include mineral acids such as hydrochloric acid or phosphoric acid, and organic acids such as acetic acid, or acetyl chloride. The EP'292 reference further discloses that, if desired, a catalyst may be employed to assist in the curing, examples of which include benzoyl peroxide, dichlorobenzoyl peroxide, and di-t-butyl peroxide.

Hamada et al. in U.S. Pat. No. 5,100,976 discloses a silicone pressure sensitive adhesive composition comprising a polydiorganosiloxane, an organopolysiloxane consisting essentially of $R_3SiO_{1/2}$ units and $(R^2O)_aSiO_{(4-a)/2}$ units where R is a monovalent hydrocarbon radical, and an organopolysiloxane consisting essentially of $R_3SiO_{1/2}$ units and $(R^2O)_aSiO_{(4-a)/2}$ units where R is as defined above in a molar ratio of 1:1 to 1:7. Hamada et al. further discloses that their compositions can further comprise a curing agent such as an organic peroxide.

U.S. Pat. No. 5,248,739 to Schmidt et al. discloses a silicone pressure sensitive adhesive that exhibits low adhesion to low energy substrates. The adhesive is produced by mixing together a silicone resin copolymer containing $R_3SiO_{1/2}$ units and $SiO_{4/2}$ units where R is a monovalent hydrocarbon radical and having a number average molecular weight of about 950 to 1,600 and a polydiorganosiloxane polymer. Schmidt et al. further discloses that these compositions can further comprise an organic peroxide as a crosslinking agent when the polydiorganosiloxane polymer does not contain unsaturated groups.

SUMMARY OF THE INVENTION

The present invention relates to silicone pressure sensitive adhesive compositions which are prepared by reacting a polydiorganosiloxane, a silicone resin copolymer, and a weak base catalyst.

It is an object of the present invention to provide a silicone pressure sensitive adhesive that exhibits high tack while retaining good peel adhesion and cohesive strength.

It is further an object of the present invention to provide a silicone pressure sensitive adhesive that is produced by condensing a polydiorganosiloxane in the presence of a silicone resin.

It is further an object of this invention to provide a silicone pressure sensitive adhesive having a high solids content which maintains excellent adhesive properties at low viscosities.

It is another object of this invention to provide a silicone pressure sensitive adhesive which will be particularly suitable in adhesive tape constructions.

DETAILED DESCRIPTION OF THE INVENTION

The present invention relates to a silicone pressure sensitive adhesive composition prepared by: (I) heating a mixture comprising (A) a hydroxyl-terminated polydiorganosiloxane having a viscosity of from 100 to 10,000,000 mm$^2$/s at 25° C. or a mixture of a hydroxyl-terminated polydiorganosiloxane and a polydiorganosiloxane selected from polydiorganosiloxanes terminated with monovalent hydrocarbon radicals free of aliphatic unsaturation or alkenyl-terminated polydiorganosiloxanes wherein said mixture has a viscosity of from 100 to 10,000,000 mm$^2$/s at 25° C., (B) a soluble silicone resin comprising $R_3SiO_{1/2}$ siloxane units and $SiO_{4/2}$ units, wherein R is selected from a monovalent hydrocarbon or halohydrocarbon radical free of aliphatic unsaturation and having from 1 to 20 carbon atoms, an alkenyl radical, or a hydroxyl radical, and (C) an organic amine compound or metal salt thereof to form a reaction product, and (II) adding (D) an organic peroxide or azo compound to the reaction product of (I).

The hydroxyl-terminated polydiorganosiloxane of component (A) is preferably a polydiorganosiloxane having the general formula $HOR^1_2SiO(R^1_2SiO)_aSiR^1_2OH$ wherein each $R^1$ is independently selected from a monovalent hydrocarbon or halohydrocarbon radical having from 1 to 20 carbon atoms or an alkenyl radical. The monovalent hydrocarbon radicals free of aliphatic unsaturation include alkyl radicals such as methyl, ethyl, propyl, pentyl, octyl, undecyl or octadecyl, cycloaliphatic radicals such as cyclohexyl, aryl radicals such as phenyl, tolyl, xylyl, benzyl or 2-phenylethyl, and chlorinated hydrocarbon radicals such as 3-chloropropyl and dichlorophenyl. The alkenyl radicals include vinyl, allyl, butenyl, hexenyl, cyclohexenyl and beta-cyclohexenylethyl. Preferably $R^1$ is selected from methyl, phenyl, or vinyl. Preferably the hydroxyl-terminated polydiorganosiloxane of component (A) is a compound in which at least 50%, and preferably at least 85%, of the $R^1$ radicals are methyl radicals.

The average value of subscript "a" above is such that it provides a viscosity at 25° C. of about 100 mm$^2$/s (100 centistokes) to about 10,000,000 mm$^2$/s (1,000,000 centistokes), the viscosity being a function of the $R^1$ radicals on the polymer. It is especially preferred that the average value of a is such that it provides an organopolysiloxane component (A) having a viscosity in the range of 100 to 1,000,000 at 25° C., and it is highly preferred that a has a value such that the viscosity of component (A) ranges from 1,000 to 500,000 mm$^2$/s when measured at 25° C.

Specific examples of these polydiorganosiloxanes include, but are not limited to, $HOMe_2SiO(Me_2SiO)_aSiMe_2OH$, $HOMe_2SiO(Me_2SiO)_{0.94a}(Ph_2SiO)_{0.06a}SiMe_2OH$, $HOPh_2SiO(Me_2SiO)_{0.94a}(Ph_2SiO)_{0.06a}SiPh_2OH$, $HOMe_2SiO(Me_2SiO)_{0.95a}(MeViSiO)_{0.5a}SiMe_2OH$, $HOVi_2SiO(Me_2SiO)_{0.95a}(MeViSiO)_{0.05a}SiVi_2OH$, or $HOR_2SiO(Me_2SiO)_{0.88a}(Ph_2SiO)_{0.12a}SiR_2OH$ wherein R and a are as defined above.

Component (A) can also be a mixture of a hydroxyl-terminated polydiorganosiloxane and a polydiorganosiloxane selected from polydiorganosiloxanes terminated with monovalent hydrocarbon radicals free of aliphatic unsaturation or alkenyl-terminated polydiorganosiloxanes wherein said mixture has a viscosity of from 100 to 10,000,000 mm$^2$/s at 25° C. The hydroxyl-terminated polydiorganosiloxane is as described above including preferred embodiments thereof. The monovalent hydrocarbon radicals free of aliphatic unsaturation and the alkenyl radicals are as described above including preferred embodiments thereof.

Specific examples of polydiorganosiloxanes terminated with monovalent hydrocarbon radicals free of aliphatic unsaturation include, but are not limited to, $Me_3SiO(Me_2SiO)_aSiMe_3$, $Me_3SiO(Me_2SiO)_{0.95a}(MeViSiO)_{0.05a}SiMe_3$, or $Me_3SiO(Me_2SiO)_{0.5a}(MePhSiO)_{0.5a}SiMe_3$ wherein Me, Vi, and Ph denote methyl, vinyl and phenyl, respectively, and a has an average value as defined above.

Specific examples of polydiorganosiloxanes terminated with alkenyl radicals include, but are not limited to, $ViMe_2SiO(Me_2SiO)_aSiMe_2Vi$, $ViMe_2SiO(Me_2SiO)_{0.95a}(MePhSiO)_{0.05a}SiMe_2Vi$, $ViMe_2SiO(Me_2SiO)_{0.98a}(MeViSiO)_{0.02a}SiMe_2Vi$, $PhMeViSiO(Me_2SiO)_aSiPhMeVi$, or $PhMeViSiO(Me_2SiO)_{0.8a}(MePhSiO)_{0.1a}(Ph_2SiO)_{0.1a}SiPhMeVi$, wherein Me, Vi, and Ph denote methyl, vinyl and phenyl, respectively, and a has an average value as defined above.

In component (A) it is also preferred that the sum of phenyl and vinyl radicals should not exceed 30% of the silicon atoms. In addition, component (A) can comprise trace amounts of siloxane branching sites, such as $R^2SiO_{3/2}$ units and $SiO_{4/2}$ units, provided that the component remains flowable. Component (A) is well known in the art and can be prepared by known methods.

The amount of component (A) in the compositions of this invention is preferably from about 30 parts by weight to about 50 parts by weight, and more preferably from about 38 parts by weight to about 47 parts by weight per 100 parts by weight of components (A)+(B).

Component (B) of the instant invention is a soluble silicone resin comprising $R_3SiO_{1/2}$ siloxane units (M units) and $SiO_{4/2}$ siloxane units (Q units), wherein R is selected from a monovalent hydrocarbon or halohydrocarbon radical having 1 to 20 carbon atoms, an alkenyl radical, or a hydroxyl group, all of which are as described above. By the term "soluble" it is meant that the silicone resin (B) can be dispersed, substantially completely, in either a hydrocarbon liquid such as benzene, toluene, xylene, heptane and the like or in a silicone liquid such as cyclic or linear polydiorganosiloxanes. Preferably the resin is soluble in component (A), delineated hereinabove. Preferably the silicone resin of component (B) is a soluble hydroxy-functional organopolysiloxane resin consisting of M units and Q units. In the hydroxyl functional organopolysiloxane resin the $R_3SiO_{1/2}$ siloxane units are bonded to the $SiO_{4/2}$ units each of which is bonded to at least one other $SiO_{4/2}$ unit. Some of the $SiO_{4/2}$ units are bonded to hydroxy radicals resulting in $HOSiO_{3/2}$ units, thereby accounting for the silicon-bonded hydroxyl content of the resin. In addition, the resin may contain a small amount of a low molecular weight material comprised substantially of a neopentamer organopolysiloxane having the formula $(R^3{}_3SiO)_4Si$.

It is preferable that the hydroxy-content of the silicone resin as determined by $^{29}Si$ NMR (nuclear magnetic resonance) ranges from 1.0 wt % to 5.0 wt % based on the resin solids content, and preferably 1.5 wt % to 3.5 wt %. Although resins having less than 1.0 wt % hydroxy can be used in the instant invention, such resins are less favorable since the triorganosilyl groups would have to be cleaved and the hydroxy introduced during the reaction to produce the silicone pressure sensitive adhesive.

In the formula for organopolysiloxane resin (B), the monovalent hydrocarbon radicals free of aliphatic unsaturation and the alkenyl radicals are as defined above, including preferred embodiments thereof. Preferably R is selected from methyl, phenyl, vinyl, or hydroxyl. Preferably, at least one-third, and more preferably substantially all R radicals in the formula for component (B) are methyl radicals. Examples of preferred $R_3SiO_{1/2}$ siloxane units include $Me_3SiO_{1/2}$, $ViMe_2SiO_{1/2}$, $PhMe_2SiO_{1/2}$, or $Ph_2MeSiO_{1/2}$ where Me denotes methyl, Ph denotes phenyl, and Vi denotes vinyl.

It is preferred that the molar ratio of $R_3SiO_{1/2}$ siloxane units to $SiO_{4/2}$ units is 0.5 to 1.3. It is more preferred that the mole ratio of the total $R_3SiO_{1/2}$ siloxane units to $SiO_{4/2}$ units be between 0.6 and 1.0. The above M/Q mole ratios can be easily obtained by $^{29}Si$ NMR. It is preferred that component (B) have a number average molecular weight (Mn) of about 3,000 to 7,500 when measured by gel permeation chromatography (GPC) against a polydimethylsiloxane standard. It is especially preferred that the molecular weight of Component (B) is from 3,500 to 6,000.

Component (B) can be prepared by well known methods. It is preferably prepared by the silica hydrosol capping process of U.S. Pat. No. 2,676,182 to Daudt et al., as modified by U.S. Pat. No. 3,627,851 to Brady, and U.S. Pat. No. 3,772,247 to Flannigan, each patent being incorporated herein by reference to teach how to prepare soluble organopolysiloxanes which are useful in the instant invention. Further, component (B) can be prepared by the cohydrolysis of a trialkyl hydrolyzable silane and alkyl silicate as described in U.S. Pat. No. 2,857,356, to Goodwin herein incorporated by reference for its teaching of how to prepare the resin.

The amount of component (B) in the compositions of this invention is preferably from about 50 parts by weight to about 70 parts by weight, and more preferably from about 53 parts by weight to about 62 parts by weight per 100 parts by weight of components (A)+(B).

Component (C) of the present invention is an organic amine compound or a metal salt of an organic amine. The amine compound is preferably selected from tertiary amines, carboxylic acid salts of organic amines, secondary amines, or quaternary ammonium salts. Amines suitable for use as component (C) include primary amines such as methylamine, ethylamine, propyl amine, hexylamine, butanolamine, and butylamine, secondary amines such as dimethylamine, diethylamine, diethanolamine, dipropylamine, dibutylamine, dihexylamine, ethylamylamine, imidazole, and propylhexylamine, tertiary amines such as trimethylamine, triethylamine, tripropylamine, tributylamine, trihexylamine, methyldipropylamine, tripropanolamine, pyridine, N-methylimidazole, and methylpropylhexylamine, carboxylic acid salts of organic amines such as diethylammonium acetate, butylammonium octoate, and trimethylammonium laurate, and quaternary ammonium salts such as tetramethylammonium acetate, methylethyldibutylammonium chloride, or dioctadecyldimethylammonium chloride. It is highly preferred that component (C) is a tertiary amine.

The amount of component (C) in the compositions of this invention is preferably from about 0.1 parts by weight to about 20 parts by weight, and more preferably from about 0.5 parts by weight to about 5 parts by weight per 100 parts by weight of components (A)+(B).

The reaction product of step (I) is made by heating a mixture of components (A), (B), and (C) at a temperature of above 100° C. The mixing of these components can be enhanced, if desired, by the use of one or more solvents in the mixture of step (I), such as benzene, toluene, xylene, naphtha, mineral spirits, or alcohols such as methanol, ethanol, isopropanol, butanol, or n-propanol. The amount of solvent, if used, ranges from about 10 to 80 parts by weight per 100 parts by weight of components (A)+(B). The mixture of (A)–(C) is generally heated for up to 4 hours at temperatures of from 150 to 180° C., however, the time and temperature are dependent on the selection and concentration of the reaction components. The reaction is essentially complete when the viscosity of the reaction product begins to level off. The heating of the mixture of (A)–(C) results in the formation of a reaction product.

When a solvent is used, it may be necessary to strip off the solvent after the formation of the reaction product. Methods of stripping volatile components are well known in the art and need no extensive delineation herein. Any method of removing volatile components can be used, such methods exemplified by molecular stills, rotoevaporators, and wipe film evaporators, with the preferred method being rotoevaporators.

The mixture of step (I) can also further comprise a rare earth metal salt of a fatty acid. Examples of rare earth metals suitable for forming the salt include cerium, lanthanum, praseodymium, with cerium being preferred. The fatty acid generally contains about 6 to 18 carbon atoms, most preferably about 8 carbon atoms. The preferred rare earth metal salt is cerium octoate. The rare earth metal salt is generally used in the compositions of this invention to provide the composition with an amount of rare earth metal within the range of from about 1 to about 1000 parts by weight, and preferably from about 10 to about 250 parts by weight per one million parts by weight of components (A)+(B). Typically, the rare earth metal salt if used is in the form of a 30% solution, 6% of which is composed of the active rare earth metal. Solvents suitable for the rare earth metal solution include hexane, heptane, toluene, xylene, naphtha, mineral spirits, or ketones.

It is preferred that the reaction product of step (I) have a solids content of at least 70% and a viscosity of up to 200,000 millipascal-seconds (mPa×s), more preferably has a solids content of at least 75% and a viscosity of up to 150,000 mPa×s, and it is highly preferred that the reaction product of step (I) has a solids content of at least 80% and a viscosity of up to 100,000 mPa×s.

In step (II), component (D) an organic peroxide or azo compound is added to the reaction product of step (I). Examples of organic peroxides which are suitable as component (D) include diacyl peroxides such as benzoyl peroxide or dichlorobenzoyl peroxide. Benzoyl peroxide has been found to be a particularly effective organic peroxide.

Examples of azo compounds suitable as component (D) include azobenzene, azobenzene-p-sulfonic acid, azobisdimethylvaleronitrile, azobisisobutyronitrile, or azodine, with azobisisobutyronitrile being preferred. Component (D) when added to the product of step (I) can be added as a solution, for example, in an appropriate solvent such as benzene, toluene, xylene, naphtha, chlorocarbons, or mineral spirits.

The amount of Component (D) in the compositions of this invention is preferably from about 0.1 to 5 parts by weight, and more preferably from about 1.5 to 3.5 parts by weight per 100 parts by weight of components (A)+(B).

During or after the formation of the silicone pressure sensitive adhesive composition, small amounts of additional ingredients may be added to the composition so long as they do not materially affect the pressure sensitive adhesive composition. These additional ingredients may be exemplified by, but not limited to, antioxidants, pigments, stabilizers, fillers, and others. It should be apparent to one skilled in the art that a blend of two reaction products, each having different amounts of components (A), (B), and/or (C), can be formed in Step (I), and then this blend can be catalyzed according to Step (II).

The present invention also relates to a method of making a silicone pressure sensitive adhesive composition comprising the steps of (I) heating a mixture comprising (A) a hydroxyl-terminated polydiorganosiloxane having a viscosity of from 100 to 10,000,000 mm$^2$/s at 25° C. or a mixture of a hydroxyl-terminated polydiorganosiloxane and a polydiorganosiloxane selected from polydiorganosiloxanes terminated with monovalent hydrocarbon radicals free of aliphatic unsaturation or alkenyl-terminated polydiorganosiloxanes wherein said mixture has a viscosity of from 100 to 10,000,000 mm$^2$/s at 25° C., (B) a soluble silicone resin comprising $R_3SiO_{1/2}$ siloxane units and $SiO_{4/2}$ units, wherein R is selected from a monovalent hydrocarbon or halohydrocarbon radical free of aliphatic unsaturation and having from 1 to 20 carbon atoms, an alkenyl radical, or a hydroxyl radical, and (C) an organic amine compound or metal salt thereof to form a reaction product, and (II) adding (D) an organic peroxide or azo compound to the reaction product of (I).

Components (A), (B), (C), and (D) are as described above including preferred embodiments thereof. The mixture of step (I) can further comprise a solvent and/or a rare earth metal salt of a fatty acid as described above including amounts and preferred embodiments thereof.

The present invention further relates to an article of manufacture prepared by (I) applying a silicone pressure sensitive adhesive composition to at least one surface of a substrate, wherein the silicone pressure sensitive adhesive composition is prepared by (i) heating a mixture comprising (A) a hydroxyl-terminated polydiorganosiloxane having a viscosity of from 100 to 10,000,000 mm$^2$/s at 25° C. or a mixture of a hydroxyl-terminated polydiorganosiloxane and a polydiorganosiloxane selected from polydiorganosiloxanes terminated with monovalent hydrocarbon radicals free of aliphatic unsaturation or alkenyl-terminated polydiorganosiloxanes wherein said mixture has a viscosity of from 100 to 10,000,000 mm$^2$/s at 25° C., (B) a soluble silicone resin comprising $R_3SiO_{1/2}$ siloxane units and $SiO_{4/2}$ units, wherein R is selected from a monovalent hydrocarbon or halohydrocarbon radical free of aliphatic unsaturation and having from 1 to 20 carbon atoms, an alkenyl radical, or a hydroxyl radical, and (C) an organic amine compound or metal salt thereof to form a reaction product, and (ii) adding (D) an organic peroxide or azo compound to the reaction product of (i), and (II) heating the silicone pressure sensitive adhesive composition and the substrate to cure the composition. The method can further comprise (III) contacting a solid support with the substrate having the adhesive composition cured thereon after step (II) whereby the solid support and the substrate are adhered together.

Components (A), (B), (C), and (D) and the method by which the silicone pressure sensitive adhesive composition is prepared is as described above including preferred embodiments thereof. The mixture of step (i) can further comprise a solvent and/or a rare earth metal salt of a fatty acid as described above including amounts and preferred embodiments thereof.

The silicone pressure sensitive adhesives of this invention are useful as pressure sensitive adhesives and will readily stick to support a solid support, whether flexible or rigid. These compositions may be applied to a surface by any suitable means such as rolling, spreading, spraying, etc., and cured as described above.

The surface of the support and the substrate to which the support is adhered may be any known solid material such as metals, such as aluminum, silver, copper, iron and their alloys, porous materials such as paper, wood, leather, and fabrics, organic polymeric materials such as polyolefins including polyethylene and polypropylene, fluorocarbon polymers such as polytetrafluoroethylene and polyvinylfluoride, silicone elastomers, silicone resins, polystyrene, polyamides such as Nylon, polyimides, polyesters and acrylic polymers, painted surfaces, siliceous materials such as concrete, bricks, cinderblocks, and glass such as glass cloth. Porous materials such as glass cloth are often impregnated with a substance that will prevent the migration of the silicone pressure sensitive adhesive from one surface to another surface of the support. In this regard, it is also well known to chemically treat, physically treat (for example etching, etc.), or primecoat (adding a curable polysiloxane) the surface of a substrate prior to addition of the silicone PSA to enhance the adhesion of the silicone pressure sensitive adhesive to said surface. The PSA's of the invention are particularly suited to applications wherein good adhesion to a low energy surface (e.g., polyethylene or Teflon™) is desired.

The amount of silicone pressure sensitive adhesive composition to be applied to the surfaces should be sufficient to render the surface definitely tacky to the touch after the removal of any solvent. After applying it to the surface, the adhesive may be cured by air drying or heating at temperatures of up to 300° C.

Solid supports bearing the cured compositions of this invention are readily adhered to any solid substrate because the silicone pressure sensitive adhesive compositions of this invention have high tack and good adhesive strength.

Useful articles which can be prepared with the silicone pressure sensitive adhesives of this invention include pressure sensitive tapes, labels, emblems and other decorative or informational signs, among others. In particular, the silicone pressure sensitive adhesives are useful in tapes such as a splicing tape in label and paper stock manufacture and converting. An especially useful article is one comprising a flexible or rigid support that can withstand extreme temperatures, hot and/or cold, and carrying on at least one surface thereof the silicone pressure sensitive adhesives of this invention. Such an article makes full use of the stability at high temperatures and the flexibility at low temperatures that the silicone pressure sensitive adhesives of this invention possess.

EXAMPLES

All parts and percentages are on a weight basis and all measurements were obtained at 25° C. unless otherwise indicated. The molecular weight properties of the polydimethylsiloxane polymers below were determined by Gas Phase Chromatography (GPC) in a toluene solvent, and using a polydimethylsiloxane standard.

The apparatus and testing procedures used for the results shown herein are as follows:

Adhesion was measured by applying a 6×1 inch strip of a Kapton™- or Mylar™-backed adhesive to a clean 2×6 inch stainless steel, polyethylene (PE) or Teflon™ panel using two passes of a 4.5 lb. rubber-coated roller. The force required to remove the tape from the panel was measured with a Keil Tester at an peel angle of 180° at a rate of 12 inches per minute. The values recorded are the average of multiple readings taken during the course of one pull per sample. The Keil Tester is described in TAPPI, vol. 43, No. 8. pages 164A and 165A (August 1960). The readings are reported in units of ounces per inch (oz/in).

Tack was measured on five one-inch squares of the Kapton™ or Mylar™-backed adhesive using a POLYKEN® probe tack tester, available from Testing Machines, Inc., Amityville, N.Y. The tack tester has a 0.5 cm diameter stainless steel probe. The test procedure used a 20 gram weight, a dwell time of 1.0 seconds and a pull speed of 0.5 cm per second. The results reported represent the average of at least five readings, expressed in grams.

The cohesive strength of the compositions was measured by devolatilizing non-catalyzed, 2 gram samples of the adhesive at 150° C. for one hour in an aluminum foil container, and then physically tearing the container and the cured film apart. The container halves are then pulled apart. If the film stretches across the tom cup, with rubber-like elongation, the cohesive strength is recorded as "Pass". If the film tears along with the cup and exhibits very little elongation the result is recorded as "Fail".

The high temperature hold was measured by preparing triplicate samples according to the following procedure: To begin, one inch wide strips of 2 mil PSA films, supported on a 1 mil Kapton® backing, are applied to a clean, polished, stainless steel panel, in such a way as to provide a 1 square inch area of contact between the adhesive tape and the substrate. Contact is maximized by making two passes across the bonded area using a 4.5 lb. roller. The steel panel and attached adhesive tape are then vertically mounted, and a 1000 gram weight is attached to the bottom of the adhesive strip. The mounted samples are then placed in a 400° F. oven, and are allowed to remain there for a period of five days, or until at least two out of the three samples have detached from the steel panel.

Non-volatile content, i.e. percent solids, of an adhesive material was determined by heating a two gram sample of the material at 150° C. for one hour and expressing the weight of the residue as a percentage of the original sample weight.

The non-volatile content of the MQ resins was determined by mixing about 1.5 grams of resin solution with about 0.75 grams of a polydimethylsiloxane fluid having a viscosity of 100 centistokes (cS) (100 mm$^2$/s), followed by devolatilization at 150° C. for 2 hours.

Molecular weights of the soluble silicone resins were measured by gel-permeation chromatography (GPC) using Varian TSK 4000+2500 columns at 35° C. in a toluene mobile phase at 1 ml/min. Polydimethylsiloxane (PDMS) standards were used for linear regression calibrations. A refractive index detector was used in the GPC measurements employing the PDMS standard calibration.

The resins in the examples were analyzed using $^{29}$Si NMR to determine the molar ratios of the $(CH_3)_3SiO_{1/2}$ units (M) to $SiO_{4/2}$ units (Q) in each resin and to determine the hydroxyl content of each resin.

Viscosities were measured in centipoise (cP) (1 cP=1 millipascal-second (mPa·s)) at room temperature (25°30 /-2° C.) using a Brookfield rotating disc viscometer fitted with an LV-4 spindle. The following materials were employed in preparing the compositions in the examples:

POLYMER A was a hydroxyl-endblocked polydimethylsiloxane fluid having a viscosity of about 330,000 mPa·s, a number average molecular weight (Mn) of 90,310, and a weight average molecular weight (Mw) of 174,700.

POLYMER B was a hydroxyl-endblocked polydimethylsiloxane fluid having a viscosity of about 150,000 mPa·s, an Mn of 73,820, and an Mw of 138,600.

POLYMER C was a hydroxyl-endblocked polydimethylsiloxane fluid having a viscosity of about 55,000 mPa·s, an Mn of 52,910, and an Mw of 101,200.

POLYMER D was a hydroxyl-endblocked polydimethylsiloxane fluid having a viscosity of about 15,000 mPa·s, an Mn of 38,200, and an Mw of 68,470.

POLYMER E was a hydroxyl-endblocked polydimethylsiloxane fluid having a viscosity of about 2,000 mPa·s, an Mn of 21,490, and an Mw of 37,950.

POLYMER F was a hydroxyl-endblocked polydimethylsiloxane gum having a plasticity of about 58 mils as measured by ASTM D926-27.

POLYMER G was a hydroxyl-endblocked polydimethylsiloxane fluid having a viscosity of about 55,000 mPa·s, an Mn of 56,340, and an Mw of 102,100.

POLYMER H was a hydroxyl-endblocked polydimethylsiloxane gum copolymer containing 4 mole % MeViSiO repeat units and having a plasticity of about 59 mils as measured by ASTM D926-27.

RESIN A was a benzene-soluble, siloxane resin consisting of $(CH_3)_3SiO_{1/2}$ (M) units and $SiO_{4/2}$ (Q) units and having an M/Q ratio of 0.78/1.0, a hydroxyl content of 2.9 wt %, and the following molecular weight characteristics as determined by GPC in Chloroform, using fractionated MQ resin standards and an IR detector, an Mn of 4,300, an Mw of 14,600, and an Mw/Mn of 3.395.

RESIN B was benzene-soluble, siloxane resin consisting of $(CH_3)_3SiO_{1/2}$ (M) units and $SiO_{4/2}$ (Q) units and having an M/Q ratio of 0.76/1.0, a hydroxyl content of 3.0 wt %, and the following molecular weight characteristics as determined by GPC in Chloroform, using fractionated MQ resin standards and an IR detector, an Mn of 4,295, an Mw of 14,500, and an Mw/Mn of 3.375.

THERMAL STABILITY ADDITIVE was Ten-Cem™ (a dispersion of a neodecanoate salt of a rare earth metal in mineral spirits having 6% active metals in the mineral spirits from Mooney Chemicals, Inc., Cleveland, Ohio).

PEROXIDES:

Perkadox® PD-50S-ps-a—a 50 wt % 2,4-dichlorobenzoyl peroxide supplied in a proprietary polysiloxane fluid by Akzo Chemical.

Benzoyl Peroxide, in granular form, was 98% pure supplied by Aldrich Chemical Company.

Comparative Example 1

148.8 grams (gm) of Resin A, 74.2 gm of polymer A, 77.0 gm of toluene, and 0.06 gm of thermal stability additive were combined and thoroughly blended in a 500 ml, three-necked flack equipped with a stirrer, thermometer, condenser, and Dean Stark Trap. The mixture was heated to reflux and maintained at reflux for approximately 2 hours.

The resultant product was then stripped at atmospheric pressure to a desired non-volatiles content of about 75% solids. The viscosity of the resultant composition was determined to be approximately 4,000 mPa·s at 75% solids.

The resultant pressure sensitive adhesive composition (PSA) was then tested for cohesive strength as described above and failed thus showing that the cohesive strength of the pressure sensitive adhesive was poor.

Comparative Example 2

148.8 gm of Resin A, 74.2 gm of polymer A, 77.0 gm of toluene, and 0.06 gm of thermal stability additive were combined and thoroughly blended in a 500 ml, three-necked flack equipped with a stirrer, thermometer, condenser, and Dean Stark Trap. The resultant blend was then stripped at atmospheric pressure to a desired non-volatiles content of about 75% solids. The viscosity of the resultant PSA was determined to be approximately 4,600 mPa·s at 75% solids.

The resultant pressure sensitive adhesive composition (PSA) was then tested for cohesive strength as described above and failed thus showing that the cohesive strength of the pressure sensitive adhesive was poor.

Example 1

148.8 gm of Resin A, 74.2 gm of polymer A, 77.0 gm of toluene, 0.06 gm of thermal stability additive, and 0.9 gm of pyridine were combined and thoroughly blended in a three-necked flack equipped with a stirrer, thermometer, condenser, and Dean Stark Trap. The mixture was heated to reflux and maintained at reflux for approximately 2 hr. Any appreciable amount of water generated, was continuously removed during the reflux step. The resultant product was then stripped at atmospheric pressure to a desired non-volatiles content of about 75% solids. The viscosity of the resultant PSA was determined to be approximately 23,250 mPa·s at 76.1% solids.

The resultant pressure sensitive adhesive composition (PSA) was then tested for cohesive strength as described above and passed thus showing that the cohesive strength of the pressure sensitive adhesive was good.

Example 2

Approximately 186 gm of Resin A, 93.2 gm of polymer B, 20.8 gm of toluene, 0.06 gm of thermal stability additive, and 1.12 gm of pyridine were combined and thoroughly blended in a three-necked flack equipped with a stirrer, thermometer, condenser, and Dean stark Trap. The mixture was heated to reflux and maintained at reflux for approximately 4 hr. Any appreciable amount of water generated, was continuously removed during the reflux step. The resultant product was then stripped at atmospheric pressure to a desired non-volatiles content of about 75% solids. The viscosity of the resultant PSA was determined to be approximately 18,000 mPa·s.

Example 3

Approximately 146.3 gm of Resin A, 76.8 gm of polymer C, 77.0 gm of toluene, 0.06 gm of thermal stability additive, and 1.8 gm of pyridine were then blended and heated according to the procedure of Example 2. The resultant product was then stripped at atmospheric pressure to a desired non-volatiles content of about 85% solids. The resultant high solids product was then recovered and stored for later use. The final product was determined have a viscosity of approximately 54,000 mPa·s at 85.1% solids.

Example 4

Approximately 147.5 gm of Resin B, 76.4 gm of polymer D, 76.2 gm of toluene, 0.06 gm of thermal stability additive, and 3.6 gm of pyridine were then blended and heated according to the procedure of Example 2. The resultant product was then stripped at atmospheric pressure to a desired non-volatiles content of about 85% solids. The resultant PSA was then recovered and the viscosity was measured to be about 31,200 mPa·s at 83% solids.

Example 5

Approximately 146.3 gm of Resin A, 76.0 gm of polymer E, 77.7 gm of toluene, 0.06 gm of thermal stability additive, and 3.6 gm of pyridine were then blended and heated according to the procedure of Example 2. The resultant product was then stripped at atmospheric pressure to a desired non-volatiles content of about 90% solids. The viscosity of the resultant PSA product was determined to be about 22,500 mPa·s at 89% solids.

Example 6

Approximately 150.1 gm of Resin A, 73.6 gm of polymer D, 76.3 gm of toluene, 0.06 gm of a thermal stability additive, and 3.6 gm of pyridine were then blended and heated according to the procedure of Example 2. The resultant product was then stripped at atmospheric pressure to a desired non-volatiles content of about 85% solids. The viscosity of the resultant PSA product was determined to be about 25,000 mPa·s at 84.5% solids.

Example 7

Approximately 150.1 gm of Resin A, 73.6 gm of polymer D, 76.3 gm of toluene, 0.06 gm of a thermal stability additive, and 4.6 gm triethylamine were then blended and heated according to the procedure of Example 2. The resultant product was then stripped at atmospheric pressure to a desired non-volatiles content of about 85% solids. The viscosity of the resultant PSA product was determined to be about 12,000 mPa·s at 83.6% solids.

Example 8

Approximately 146.3 gm of Resin A, 70.3 gm of polymer D, 6.7 gm polymer F, 77.4 gm of toluene, 0.06 gm of a thermal stability additive, and 0.9 gm of pyridine were then blended and heated according to the procedure of Example 2. The resultant product was then stripped at atmospheric pressure to a desired non-volatiles content of about 85% solids. The viscosity of the resultant PSA was determined to be about 45,000 mPa·s at 84.6% solids.

Example 9

Portions of the PSA samples described in Examples 1, 2, 3, 4, 5, and 8 were catalyzed with benzoyl peroxide at a 2% level of peroxide solids based on PSA solids content in the adhesive sample. The peroxide was incorporated into the PSA as a 10% solution in toluene. The adhesive solution was then cast onto 1 mil Kapton® film at a thickness sufficient to yield a 2 mil cured PSA film. The cast PSA films were devolatilized for 2 minutes at 70° C., and then cured for 2 additional minutes at 204° C. The resultant sheets supporting the PSA coatings were then cut into 1" wide strips and tested for adhesion and tack according to the procedures described above. The results are shown in Table 1 below.

TABLE 1

| PSA SAMPLE | ADHESION | TACK |
| --- | --- | --- |
| Ex. 1 | 34 oz/in | 811 gm/cm$^2$ |
| Ex, 2 | 33 oz/in | 871 gm/cm$^2$ |
| Ex. 3 | 28 oz/in | 858 gm/cm$^2$ |
| Ex. 4 | 28 oz/in | 781 gm/cm$^2$ |
| Ex. 5 | 22 oz/in | 862 gm/cm$^2$ |
| Ex. 8 | 26 oz/in | 802 gm/cm$^2$ |

Example 10

Portions of the PSA samples described in Comparative Examples 1 and 2, and Example 1, were catalyzed as described in Example 9, and cast onto 2 mil Polyester film (Mylar A) at a thickness sufficient to yield a 2 mil cured PSA film. The cast PSA film was devolatilized for 2 minutes at 70° C., and then cured for 2 additional minutes at 178° C. The resultant sheet supporting the PSA coatings was then cut into 1" wide strips and tested for adhesion and tack according to the procedures described above. Results are provided in Table 2 below.

TABLE 2

| PSA SAMPLE | ADHESION | TACK |
| --- | --- | --- |
| Comparative Ex. 1 | 60 oz/in (#) | 912 gm/cm$^2$ |
| Comparative Ex. 2 | 59 oz/in (#) | 904 gm/cm$^2$ |
| Ex. 1 | 57 oz/in | 1,143 gm/cm$^2$ |

(#)- denotes cohesive failure on Stainless Steel panel.

Example 11

Portions of the PSA samples described in Examples 6 and 7 were catalyzed with Perkadox® PD-50S-ps-a at a 2% level of peroxide solid based on PSA solids content in the adhesive sample. The adhesive solutions were then cast onto 1 mil Kapton® film at a thickness sufficient to yield a 2 mil cured PSA film. The cast PSA films were devolatilized for 2 minutes at 70° C., and then for 2 additional minutes at 204° C. The resultant sheets supporting the PSA coatings were then cut into 1" wide strips and tested for adhesion and tack according to the procedures described above. Results are provided in Table 3 below.

TABLE 3

| PSA SAMPLE | ADHESION | TACK |
| --- | --- | --- |
| Ex. 6 | 26 oz/in | 724 gm/cm$^2$ |
| Ex. 7 | 28 oz/in | 925 gm/cm$^2$ |

Example 12

Portions of the PSA samples described in Examples 6 and 7, and catalyzed as described in Example 11, were also cast onto 2 mil Polyester film (Mylar A) at a "wet film" thickness sufficient to yield a 2 mil cured PSA film. The cast PSA films were devolatilized for 2 minutes at 70° C., and then cured for 2 additional minutes at 178° C. The resultant sheets supporting the PSA coatings were then cut into 1" wide strips and tested for adhesion and tack according to the procedures described above. Results are provided in Table 4 below.

TABLE 4

| PSA SAMPLE | ADHESION | TACK |
| --- | --- | --- |
| Ex. 6 | 43 oz/in | 858 gm/cm$^2$ |
| Ex. 7 | 51 oz/in | 1,101 gm/cm$^2$ |

Example 13

Approximately 146.3 gm of Resin A, 70.3 gm of polymer D, 6.6 gm of polymer F, 77.4 gm of toluene, 0.06 gm of a thermal stability additive, and 3.6 gm pyridine, were combined and thoroughly blended in a 500 ml, three-necked flask equipped with a stirrer, thermometer, condenser, and Dean Stark Trap. The mixture was heated to reflux and maintained at reflux for approximately 4 hrs. Water was continuously removed during the reflux step. The resultant product was then stripped at atmospheric pressure to a desired non-volatiles content in the range of 85% solids. The viscosity of the resultant PSA was determined to be 59,500 mpa·s at 85% solids.

A portion of the PSA sample described above was catalyzed with benzoyl peroxide at a 2% level of peroxide solids based on PSA solids content in the adhesive sample. The peroxide was incorporated into the PSA as a 10% solution in toluene. The adhesive solution was then cast onto 1 mil Kapton® film at a thickness sufficient to yield a 2 mil cured PSA film. The cast PSA film was devolatilized for 2 minutes at 70° C., and then cured for an 2 additional minutes at 204° C. The resultant, laminated film was then cut into 1" wide strips and evaluated for peel adhesion and probe tack as defined above. The film had a 180° peel adhesion of 27 oz/in and the probe tack of the film was about 836 gm/cm$^2$.

Example 14

Approximately 133.7 gm of Resin A, 85.9 gm of polymer C, 80.4 gm of toluene, 0.06 gm of a thermal stability additive, and 4.6 gm of triethylamine, were combined and thoroughly blended in a three-necked flask equipped with a stirrer, thermometer, condenser, and Dean Stark Trap. The mixture was heated to reflux and maintained at reflux for approximately 4 hrs. Water was continuously removed during the reflux step. The resultant product was then stripped at atmospheric pressure to a desired non-volatiles content in the range of 85% solids. The viscosity of the resultant PSA product was determined to be 41,000 mPa·s at 83.6% solids.

Example 15

Approximately 174.0 gm of Resin A, 56.6 gm of polymer C, 69.3 gm of toluene, 0.06 gm of a thermal stability additive, and 4.6 gm triethylamine, were combined and thoroughly blended in a three-necked flask equipped with a stirrer, thermometer, condenser, and Dean Stark Trap. The mixture was heated to reflux and maintained at reflux for approximately 4 hrs. Water was continuously removed during the reflux step. The resultant product was then stripped at atmospheric pressure to a desired non-volatiles content in the range of 85% solids. The viscosity of the resultant PSA product was determined to be 13,900 mPa·s at 85% solids.

Example 16

A PSA blend was prepared by combining 3 parts of the product described in Example 14, per 1 part of the product described in Example 15, and mixing until a uniform dispersion was obtained. The mixture was then catalyzed using a 10% solution of benzoyl peroxide in methyl ethyl ketone at a peroxide actives level of 2% based on PSA solids. The catalyzed PSA solution was then cast onto 2 mil Polyester film (Mylar A) at a thickness sufficient to yield a 1.9 mil cured PSA film. The cast PSA film was devolatilized for 2 minutes at 70° C. and then cured for 2 additional minutes at 178° C. The resultant, laminated film was then cut into 1" wide strips and evaluated for peel adhesion and probe tack as described above. The peel adhesion of the film was 61 oz/in and the probe tack was 1,250 gm/cm$^2$.

Example 17

Approximately 1,463 gm of Resin A, 768 gm of Polymer G, 777 gm of toluene, and 0.6 gm of an additive intended to improve thermal stability, were combined and blended together until a uniform mixture was obtained. Four adhesives were prepared, using the same equipment and procedures as those described in the previous examples. Each adhesive was formulated and processed using 300 gm of the mixture prepared above. To each 300 gm aliquot of the adhesive mixture was added 4.6 gm of triethylamine. Each sample was then heated to reflux and maintained at about 125° C. for varied time periods. Each mixture was then stripped to approximately 85% solids and recovered. Viscosity measurements were then taken at room temperature for each PSA, and documented as a function of time at reflux. The results are shown in Table 5 below.

TABLE 5

| PSA SAMPLE | TIME @ REFLUX | BROOKFIELD VISCOSITY | NON-VOLATILE CONTENT |
|---|---|---|---|
| 9a | 1 hr. | 24,750 mPa•s | 83.3% |
| 9b | 2 hr. | 31,500 mPa•s | 84.9% |
| 9c | 4 hr. | 23,750 mPa•s | 84.2% |
| 9d | 16 hr. | 32,000 mPa•s | 84.5% |

Example 18

Approximately 146.3 gm of Resin A, 76.4 gm of polymer D, 77.4 gm of toluene, 0.06 gm of thermal stability additive, and 0.9 gm of pyridine were then blended and heated according to the procedure of Example 2. The resultant product was then stripped at atmospheric pressure to a desired non-volatiles content of about 85% solids. The resultant PSA was then recovered and measured to be 14,000 mPaxs at 84.6% solids. One portion of the adhesive composition was catalyzed with a 2% loading of benzoyl peroxide as described in Example 9. A second portion was left uncatalyzed. Both samples were applied to 1 mil Kapton™ film, and thermally exposed for two minutes at 70° C., and then for two additional minutes at 204° C. The coated plastic film was then cut into 1" wide strips and evaluated for its high temperature hold according to the procedure described above at 400° F., which is a good measure of cohesive strength in the bulk adhesive. The peroxide cured sample passed after 5 days at the elevated temperature, whereas the samples, which did not contain peroxide, detached from the steel panel within a few hours after the test was started.

Example 19

Approximately 146.3 gm of Resin A, 76.4 gm of polymer B, 77.4 gm of toluene, 0.06 gm of a thermal stability additive, and 3.6 gm of pyridine were then blended and heated according to the procedure of Example 2. The resultant product was then stripped at atmospheric pressure to a desired non-volatiles content of about 85% solids. The viscosity of the resultant PSA product was determined to be about 78,000 mPa·s at 85.2% solids. One portion of the adhesive composition was catalyzed with a 2% loading of benzoyl peroxide as described in Example 9. A second portion was left uncatalyzed. Both samples were applied to 1 mil Kapton™ film, and thermally exposed for two minutes at 70° C., and then for two additional minutes at 204° C. The coated plastic film was then cut into 1" wide strips and evaluated for its high temperature hold according to the procedure described above at 400° F., which is a good measure of cohesive strength in the bulk adhesive. The peroxide cured sample passed after 5 days at the elevated temperature, whereas the samples, which did not contain peroxide, detached from the steel panel within a few hours after the test was started.

What is claimed is:

1. A method of making an article of manufacture comprising:
    (I) applying a silicone pressure sensitive adhesive composition to at least one surface of a substrate, wherein the silicone pressure sensitive adhesive composition is obtained by a method comprising:
        (i) heating a mixture comprising:
            (A)(i) a hydroxyl-terminated polydiorganosiloxane having a viscosity of from 100 to 10,000,000 mm$^2$/s at 25° C. or
            (ii) a mixture of (a) a hydroxyl-terminated polydiorganosiloxane and (b) a polydiorganosiloxane selected from (i) polydiorganosiloxanes terminated with monovalent hydrocarbon radicals free of aliphatic unsaturation or (ii) alkenyl-terminated polydiorganosiloxanes wherein said mixture has a viscosity of from 100 to 10,000,000 mm$^{2/}$s at 25° C.;
            (B) a soluble silicone resin comprising $R_3SiO_{1/2}$ siloxane units and $SiO_{4/2}$ units, wherein R is selected from a monovalent hydrocarbon or halohydrocarbon radical free of aliphatic unsaturation and having from 1 to 20 carbon atoms, an alkenyl radical, or a hydroxyl radical; and
            (C) an organic amine compound selected from the group consisting of primary amines, secondary amines, and tertiary amines, or a metal salt of an organic amine compound selected from the group consisting of carboxylic acid salts of organic amines and quaternary ammonium salts to form a reaction product having a solids content of at least 70% and a viscosity of up to 200,000 millipascal-seconds at 25°; and
        (ii) adding (D) an organic peroxide or azo compound to the reaction product of (i); and
    (II) heating the silicone pressure sensitive adhesive composition and the substrate to cure the composition.

2. A method according to claim 1, wherein the method further comprises (III) contacting a solid support with the substrate having the adhesive composition cured thereon after step (II) whereby the solid support and the substrate are adhered together.

3. A method according to claim 1, wherein the mixture of step (i) further comprises a solvent.

4. A method according to claim 3, wherein the method further comprises stripping the reaction product of step (i) prior to step (ii).

5. A method according to claim 3, wherein the mixture of step (i) further comprises a rare earth metal salt of a fatty acid.

6. A method according to claim 1, wherein the mixture of step (i) further comprises a rare earth metal salt of a fatty acid.

7. A method according to claim 1, wherein the hydroxyl-terminated polydiorganosiloxane is a polydiorganosiloxane having the general formula $$HOR^1{}_2SiO(R^1{}_2SiO)_aSiR^1{}_2OH$$

wherein each $R^1$ is independently selected from a monovalent hydrocarbon or halohydrocarbon radical having from 1 to 20 carbon atoms or an alkenyl radical and a has a value such that the viscosity of the polydiorganosiloxane ranges from 1,000 to 500,000 mm²/s when measured at 25° C.

8. A method according to claim 7, wherein $R^1$ is selected from methyl, phenyl, or vinyl.

9. A method according to claim 1, wherein the hydroxyl-terminated polydiorganosiloxane is selected from a polydiorganosiloxane having its formula selected from $HOMe_2SiO(Me_2SiO)_aSiMe_2OH$, $HOMe_2SiO(Me_2SiO)_{0.94a}(Ph_2SiO)_{0.06a}SiMe_2OH$, $HOPh_2SiO(Me_2SiO)_{0.94a}(Ph_2SiO)_{0.06a}SiPh_2OH$, $HOMe_2SiO(Me_2SiO)_{0.95a}(MeViSiO)_{0.05a}SiMe_2OH$, $HOVi_2SiO(Me_2SiO)_{0.95}a(MeViSiO)_{0.05a}SiVi_2OH$, or $HOR_2SiO(Me_2SiO)_{0.88a}(Ph_2SiO)_{0.12a}SiR_2OH$ wherein each R is independently selected from methyl, phenyl, or vinyl, and a has a value such that the viscosity of the polydiorganosiloxane ranges from 1,000 to 500,000 mm²/s when measured at 25° C.

10. A method according to claim 1, wherein the monovalent hydrocarbon radicals free of aliphatic unsaturation are selected from methyl or phenyl.

11. A method according to claim 1, wherein the alkenyl radical is vinyl.

12. A method according to claim 1, wherein (b)(i) is selected from $Me_3SiO(Me_2SiO)_aSiMe_3$, $Me_3SiO(Me_2SiO)_{0.95a}(MeViSiO)_{0.05a}SiMe_3$, or $Me_3SiO(Me_2SiO)_{0.5a}(MePhSiO)_{0.5a}SiMe_3$ wherein Me, Vi, and Ph denote methyl, vinyl and phenyl, respectively, and a has a value such that the viscosity of the polydiorganosiloxane ranges from 1,000 to 500,000 mm²/s when measured at 25° C.

13. A method according to claim 1, wherein (b)(ii) is selected from $ViMe_2SiO(Me_2SiO)_aSiMe_2Vi$, $ViMe_2SiO(Me_2SiO)_{0.95a}(MePhSiO)_{0.05a}SiMe_2Vi$, $ViMe_2SiO(Me_2SiO)_{0.98a}(MeViSiO)_{0.02a}SiMe_2Vi$, $PhMeViSiO(Me_2SiO)_aSiPhMeVi$, or $PhMeViSiO(Me_2SiO)_{0.8a}(MePhSiO)_{0.1a}(Ph_2SiO)_{0.1a}SiPhMeVi$, wherein Me, Vi, and Ph denote methyl, vinyl and phenyl, respectively, and a has a value such that the viscosity of the polydiorganosiloxane ranges from 1,000 to 500,000 mm²/s when measured at 25° C.

14. A method according to claim 1, wherein R is selected from methyl, phenyl, vinyl, or hydroxyl.

15. A method according to claim 1, wherein the molar ratio of $R_3SiO_{1/2}$ units to $SiO_{4/2}$ units is from 0.5 to 1.3.

16. A method according to claim 1, wherein (B) has a number average molecular weight of 3,000 to 7,500.

17. A method according to claim 1, wherein (C) is selected from methylamine, ethylamine, propyl amine, hexylamine, butanolamine, butylamine, dimethylamine, diethylamine, diethanolamine, dipropylamine, dibutylamine, dihexylamine, ethylamylamine, propylhexylamine, trimethylamine, triethylamine, tripropylamine, tributylamine, trihexylamine, pyridine, methyldipropylamine, tripropanolamine, methylpropylhexylamine, diethylammonium acetate, butylammonium octoate, trimethylammonium laurate, tetramethylammonium acetate, methylethyldibutylammonium chloride, dioctadecyldimethylammonium chloride, methylimidazole, or imidazole.

18. A method according to claim 1, wherein (D) is selected from benzoyl peroxide, dichlorobenzoyl peroxide, or azobisisobutyronitrile.

19. A method according to claim 1, wherein the reaction product of Step (i) has a solids content of at least 75% and a viscosity of up to 150,000 millipascal-seconds at 25° C.

20. A method according to claim 1, wherein the reaction product of Step (i) has a solids content of at least 80% and a viscosity of up to 100,000 millipascal-seconds at 25° C.

* * * * *